UNITED STATES PATENT OFFICE.

ROBERT B. LUCAS AND WILLIAM W. LUCAS, OF CLEVELAND, OHIO.

IMPROVEMENT IN PROCESSES OF SEPARATING OIL AND NAPHTHA FROM PARAFFINE-WAX, &c.

Specification forming part of Letters Patent No. 115,622, dated June 6, 1871.

We, ROBERT B. LUCAS and WILLIAM W. LUCAS, of Cleveland, in the county of Cuyahoga and State of Ohio, have invented a certain Process for Separating Oil and Naphtha from Paraffine-Wax, of which the following is a specification:

Take a given quantity of crude paraffine-wax, such as comes from the refining of lubricating petroleum, and place in a suitable vessel heated by steam for the purpose of melting it; also, take about two-thirds the same quantity of naphtha, heated to about a boiling temperature; then put the melted wax into the hot naphtha and stir or agitate until they become thoroughly mixed; then pour this mixture into a suitable tank of cold water for the purpose of chilling the wax, when it will rise and float on the surface of the water in a frothy or foamy mass. The wax, becoming chilled, has a tendency to separate from the more limpid matter; then, by taking up the floating wax and placing it in suitable canvas bags and submitting it to pressure in a suitable press, the oil may be readily extracted, leaving the wax quite clear and free from the oil and other matter.

By this method of chilling the wax it may be very readily separated and prepared for the market in a very short time. By the old process several months have generally been consumed in the preparation of this wax for the market, making it a tedious and expensive process.

Some other means than the direct press may be employed. A combination of rollers, by which the wax may be chilled and the oil extracted or expressed, may be devised.

The object of applying the naphtha is to cut the oil in the wax and reduce it to a more limpid state, which renders it more easily discharged.

We claim as our invention—

The process of chilling the wax by subjecting it to a water-bath before subjecting it to the press, for the purpose of readily separating the oil from the wax, substantially as described.

R. B. LUCAS.
WILLIAM W. LUCAS.

Witnesses:
GEO. W. TIBBITTS,
GEO. HESTER.